Nov. 3, 1936.  A. DETERT  2,059,933
COW STALL GUARD
Filed Nov. 4, 1935
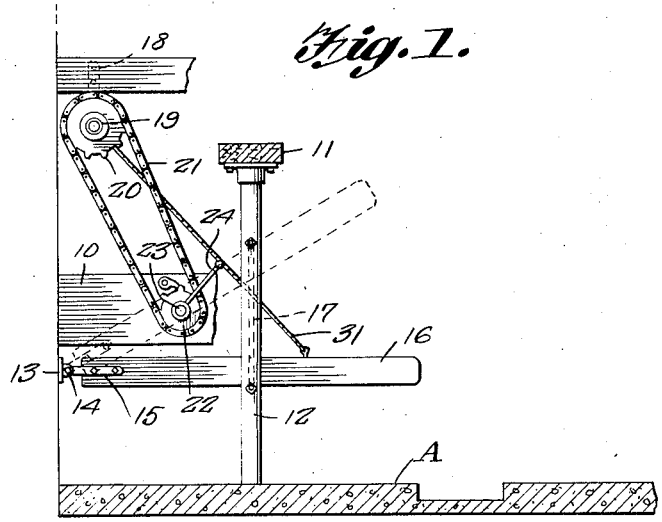
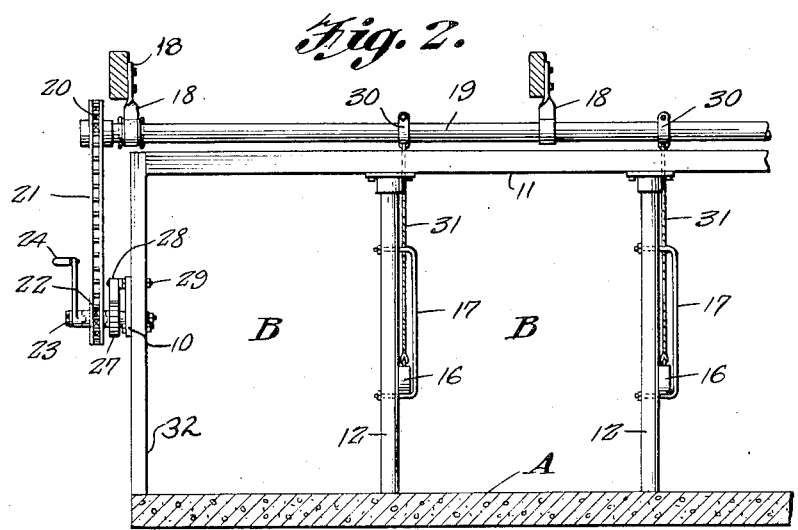
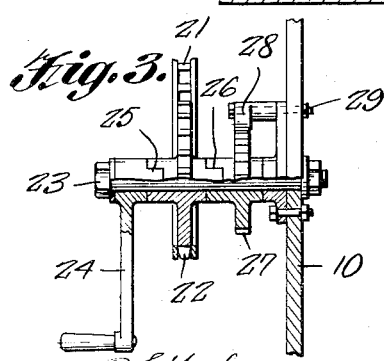
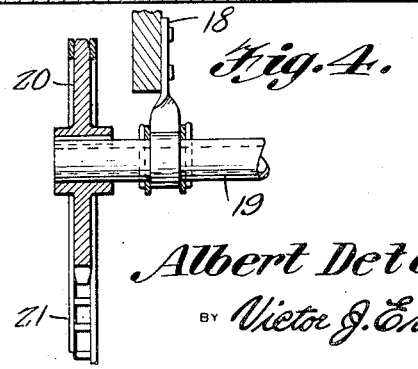
Albert Detert, INVENTOR
BY Victor J. Evans & Co. ATTORNEY Patented Nov. 3, 1936

2,059,933

UNITED STATES PATENT OFFICE 2,059,933

COW STALL GUARD

Albert Detert, Ceylon, Minn.

Application November 4, 1935, Serial No. 48,243

1 Claim. (Cl. 119—15)

The invention relates to a cow stall guard and more especially to an adjustable guard for stalls in cow barns.

The primary object of the invention is the provision of a guard of this character, wherein the same can be conveniently lowered to protect cows next to each other, particularly when one or another of the cows lies down to avoid damage or injury and when it is desired to milk the cows the guard can be raised giving freedom to the person milking such cow within the stall, the guard being of novel construction.

Another object of the invention is the provision of a guard of this character, wherein the same is in the form of a bar mounted for vertical swinging movements and is operated so that it can be raised and lowered for freedom of a person milking a cow when within a stall.

A further object of the invention is the provision of a guard of this character, which is extremely simple in construction, thoroughly reliable and efficient in its purpose, readily and easily adjusted, strong, durable and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary vertical longitudinal sectional view through a stall taken from the left of Figure 2 with parts broken away showing the guard constructed in accordance with the invention applied, the said guard being shown by full lines in lowered position and by dotted lines in raised position.

Figure 2 is a vertical transverse sectional view through a series of stalls taken from the right of Figure 1.

Figures 3 and 4 are fragmentary views with parts broken away of portions of Figure 2.

Similar reference characters indicate corresponding parts throughout the several views in the drawing.

Referring to the drawing in detail, A designates a portion of the flooring of a cow barn which has therein a series of stalls, these being indicated at B and are suitably separated while at the end of the row of the same is a plank 10 which is horizontally disposed for a purpose presently described.

Arranged associated with the stalls B overhead is a rail 11 to which are connected the upper ends of vertical posts 12. These posts 12 are a part of the separation of the stalls in the series thereof. Located at a suitable height from the flooring A and on the vertical support or wall of the barn at the closed ends of the stalls and common to each pair of the latter is a bracket 13 having pivoted at 14 a hinge part or strap 15 fixed to a guard 16 in the form of a bar for vertical swinging movement and this bar plays in a guide loop 17 carried by a post 12 so as to be limited to its swinging movements and also to sustain it horizontally when in lowered position.

Fitted in suitable hangers 18 overhead is a horizontally disposed turning shaft 19, it having a sprocket gear 20 over which is trained an endless sprocket chain 21, the same being also trained over a sprocket gear 22 journaled upon a stud shaft 23, the latter having journaled thereon a crank handle 24 which through a clutch union 25 is joined with the gear 22 for the manual turning thereof. The gear 22 is also joined by a clutch union 26 with a ratchet wheel 27 journaled upon said shaft 23 and having coacting therewith a ratchet dog 28 pivoted at 29 so that the chain 21 is free for movement in one direction and can be latched by the dog 28 against movement in the opposite direction except on the release of the dog 28 from said ratchet wheel 27. The shaft 23 has its mounting in the plank 10 and the ratchet dog 28 is pivotally supported on this plank. Carried by the shaft 19 is a clamp 30 having connected thereto a raising and lowering cable 31 which is also attached by an eye member to the top edge of the bar 16 so that when the crank handle 24 is manually turned the bar 16 can be adjusted as the cable 31 will be wound on and unwound from the shaft 19 in the working of the guard.

The bar 16 when in lowered position protects cows within the stalls V next to each other and when it is desired to milk the cows the bar 6 can be raised giving freedom of access to the stall. There is associated with the rail 11 at each end an upright 32.

What is claimed is:

The combination with a series of stalls arranged side by side and having vertical posts dividing the same from each other throughout the series and affording open sides to said stalls, loop guides on the respective posts, swinging bars operating in said guides and pivoted to a vertical wall at the head ends of said stalls, a horizontally arranged plank at one end of the series of stalls, overhead hangers above said stalls, a turning shaft fitting said hangers, hand operated sprocket gear and chain mechanism arranged between the plank and the said shaft for the turning of the latter, clamps on said shaft, flexible connections between the said bars and the clamps for the raising and lowering of the bars on the turning of said shaft, and a hand crank having separable clutch engagement with the chain and sprocket connection for controlling the same.

ALBERT DETERT.